United States Patent
Prabhakaran et al.

(10) Patent No.: US 12,204,510 B2
(45) Date of Patent: Jan. 21, 2025

(54) AUTO MAINTENANCE FOR DATA TABLES IN CLOUD STORAGE

(71) Applicant: Databricks, Inc., San Francisco, CA (US)

(72) Inventors: Vijayan Prabhakaran, Los Gatos, CA (US); Himanshu Raja, Fremont, CA (US); Rahul Potharaju, San Ramon, CA (US); Naga Raju Bhanoori, Union City, CA (US); Lin Ma, Ann Arbor, MI (US); Rajesh Parangi Sharabhalingappa, Campbell, CA (US); Jintian Liang, Mountain View, CA (US); Zachary Vaughn Schuermann, San Francisco, CA (US); Kam Cheung Ting, Mountain View, CA (US)

(73) Assignee: Databricks, Inc., San Francisco, CA (US)

( * ) Notice: Subject to any disclaimer, the term of this patent is extended or adjusted under 35 U.S.C. 154(b) by 0 days.

(21) Appl. No.: 18/144,647

(22) Filed: May 8, 2023

(65) Prior Publication Data
US 2024/0378181 A1    Nov. 14, 2024

(51) Int. Cl.
   *G06F 16/21*   (2019.01)
   *G06F 11/34*   (2006.01)
   *G06F 16/22*   (2019.01)

(52) U.S. Cl.
   CPC ........ *G06F 16/219* (2019.01); *G06F 11/3409* (2013.01); *G06F 16/2282* (2019.01)

(58) Field of Classification Search
   CPC . G06F 16/219; G06F 16/2282; G06F 11/3409
   USPC .......................................................... 707/694
   See application file for complete search history.

(56) References Cited

U.S. PATENT DOCUMENTS

| | | | | |
|---|---|---|---|---|
| 5,898,760 | A * | 4/1999 | Smets | G06F 16/2379 379/88.21 |
| 11,593,368 | B1 * | 2/2023 | Ganesh | G06F 16/2282 |
| 11,789,902 | B2 * | 10/2023 | Okutubo | G06F 16/1724 707/740 |
| 2005/0108085 | A1 * | 5/2005 | Dakar | G06Q 30/0283 705/400 |
| 2015/0281113 | A1 * | 10/2015 | Siciliano | H04L 43/0817 709/226 |
| 2016/0292627 | A1 * | 10/2016 | Yamada | G06Q 50/40 |
| 2018/0341885 | A1 * | 11/2018 | Kaulgud | G06Q 10/06393 |

(Continued)

*Primary Examiner* — Cam Linh T Nguyen
(74) *Attorney, Agent, or Firm* — Fenwick & West LLP

(57) ABSTRACT

Disclosed is a configuration for managing the organization of data tables in cloud-based storage. The configuration receives metrics for data processing operations on the data table. Metrics include at least one of a size of the data table, a size of each file in the data table, and metadata describing the data table. The configuration automatically executes a cost-benefit analysis based on the one or more metrics for each candidate maintenance operation in a plurality of candidate maintenance operations. The configuration automatically selects a maintenance operation from the candidate maintenance operations to automate based on the cost-benefit analysis of the one or more candidate maintenance operations. The selected maintenance operation is automated and scheduled on the data table.

20 Claims, 8 Drawing Sheets

(56) References Cited

U.S. PATENT DOCUMENTS

2018/0373567 A1* 12/2018 Finlay ................... G06F 9/5061
2021/0149591 A1*  5/2021 De Roeck ............. G06F 3/0619
2022/0307945 A1*  9/2022 Ema ....................... G06Q 10/20
2023/0222454 A1*  7/2023 Cella ........................ G06N 7/01
                                                            705/28

* cited by examiner

AUTO MAINTENANCE FOR DATA TABLES IN CLOUD STORAGE

TECHNICAL FIELD

This disclosed configuration relates to managing maintenance operations in data tables stored in remote storage.

BACKGROUND

Cloud-based object storage systems enable companies, individuals, and other entities to store and access large datasets. Multiple cloud-based storage systems are commonly used, such as AMAZON Web Services, GOOGLE Cloud Platform, IBM Cloud Services, MICROSOFT Azure, and other largescale cloud service providers. Better organization of table data in cloud-based object storage is a goal for improving operational performance and to reduce storage costs. Typically, users rely on manually triggered maintenance operations to manage and organize their data. However, many users do not know when to apply maintenance operations or how to apply maintenance operations in an effective manner. For example, users do not know which tables need maintenance operations at what times in order to improve performance and reduce costs. Moreover, many users do not have the permissions necessary to run maintenance operations on tables because they do not have access privileges to do so. Hence, table maintenance commands are often not used and many users continue to run their workloads causing suboptimal performance and cost efficiency. This causes further strain on cloud storage operations for both users and data management platforms alike.

The figures depict various embodiments of the present disclosure for purposes of illustration only. One skilled in the art will readily recognize from the following discussion that alternative embodiments of the structures and methods illustrated herein may be employed without departing from the principles of the embodiments described herein.

DETAILED DESCRIPTION

The Figures (FIGS.) and the following description relate to embodiments of configurations (e.g., system, methods, and/or non-transitory computer readable storage medium comprising stored instructions) by way of illustration only.

It should be noted that from the following discussion, alternative embodiments of the structures and methods disclosed herein will be readily recognized as viable alternatives that may be employed without departing from the principles of what is claimed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

Figure 1:
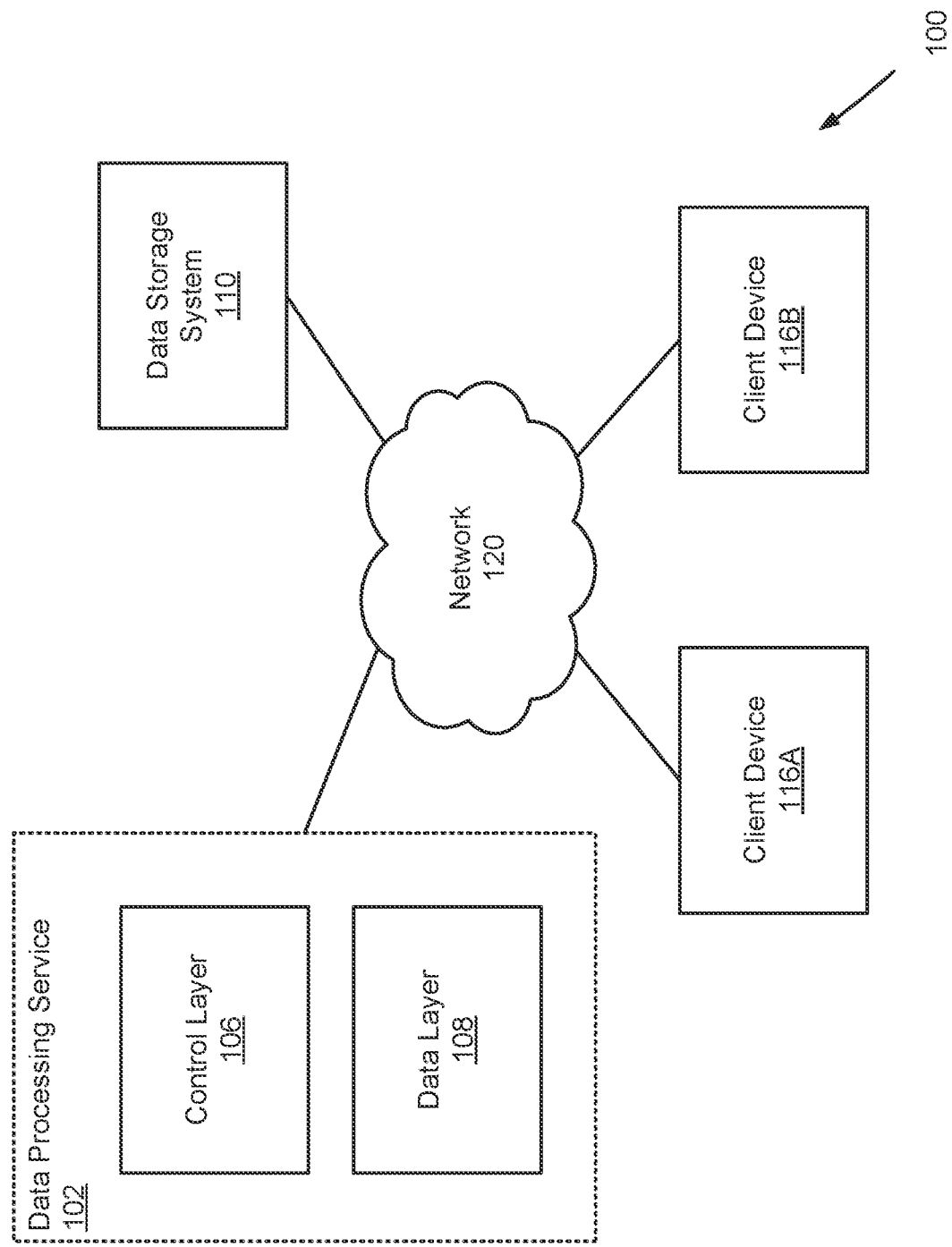
FIG. 1 is a high-level block diagram of a system environment for a data processing service, in accordance with an embodiment.

Referring now to FIG. 1, illustrated is a high-level block diagram of a system environment 100 for a data processing service 102, in accordance with an embodiment. The system environment 100 shown by FIG. 1 includes one or more client devices 116A, 116B, a network 120, a data processing service 102, and a data storage system 110. In alternative configurations, different and/or additional components may be included in the system environment 100.

The data processing service 102 is a service for managing and coordinating data processing services (e.g., database services) to users of client devices 116. The data processing service 102 may manage one or more applications that users of client devices 116 can use to communicate with the data processing service 102. Through an application of the data processing service 102, the data processing service 102 may receive requests (e.g., database queries) from users of client devices 116 to perform one or more data processing functionalities on data stored, for example, in the data storage system 110. The requests may include query requests, analytics requests, or machine learning and artificial intelligence requests, and the like, on data stored by the data storage system 110. The data processing service 102 may provide responses to the requests to the users of the client devices 116 after they have been processed.

In one embodiment, as shown in the system environment 100 of FIG. 1, the data processing service 102 includes a control layer 106 and a data layer 108. The components of the data processing service 102 may be configured by one or more servers and/or a cloud infrastructure platform. In one embodiment, the control layer 106 receives data processing requests and coordinates with the data layer 108 to process the requests from client devices 116. The control layer 106 may schedule one or more jobs for a request or receive requests to execute one or more jobs from the user directly through a respective client device 116. The control layer 106 may distribute the jobs to components of the data layer 108 where the jobs are executed. The control layer 106 is additionally capable of configuring the clusters in the data layer 108 that are used for executing the jobs. For example, a user of a client device 116 may submit a request to the control layer 106 to perform one or more queries and may specify that four clusters on the data layer 108 be activated to process the request with certain memory requirements. Responsive to receiving this information, the control layer 106 may send instructions to the data layer 108 to activate the requested number of clusters and configure the clusters according to the requested memory requirements.

The data layer 108 includes multiple instances of clusters of computing resources that execute one or more jobs received from the control layer 106. Accordingly, the data layer 108 may include a cluster computing system for executing the jobs. An example of a cluster computing system 402 is described in FIG. 4. In one instance, the clusters of computing resources are virtual machines or virtual data centers configured on a cloud infrastructure platform. In one instance, the data layer 108 is configured as a multi-tenant architecture where a plurality of data layer instances process data pertaining to various tenants of the data processing service 102. Accordingly, a single instance of the software and its supporting infrastructure serves multiple customers, each customer associated with multiple users that may access the multi-tenant system. Each customer represents a tenant of a multi-tenant system and shares software applications and also resources such as databases of the multi-tenant system. Each tenant's data is isolated and remains invisible to other tenants. For example, a respective data layer instance can be implemented for a respective tenant. However, it is appreciated that in other embodiments, single tenant architectures may be used.

The data layer 108 thus may be accessed by, for example, a developer through an application of the control layer 106 to execute code developed by the developer. In one embodiment, a cluster in a data layer 108 may include multiple worker nodes that execute multiple jobs in parallel. Responsive to receiving a request, the data layer 108 divides the cluster computing job into a set of worker jobs, provides each of the worker jobs to a worker node, receives worker job results, stores job results, and the like. The data layer 108 may include resources not available to a developer on a local development system, such as powerful computing resources to process very large data sets. In this manner, when the data processing request can be divided into jobs that can be executed in parallel, the data processing request can be processed and handled more efficiently with shorter response and processing time.

The data storage system 110 includes a device (e.g., a disc drive, a hard drive, a semiconductor memory) used for storing database data (e.g., a stored data set, portion of a stored data set, data for executing a query). In one embodiment, the data storage system 110 includes a distributed storage system for storing data and may include a commercially provided distributed storage system service. Thus, the data storage system 110 may be managed by a separate entity than an entity that manages the data processing service 102 or the data management system 110 may be managed by the same entity that manages the data processing service 102.

The client devices 116 are computing devices that display information to users and communicate user actions to the systems of the system environment 100. While two client devices 116A, 116B are illustrated in FIG. 1, in practice many client devices 116 may communicate with the systems of the system environment 100. In one embodiment, a client device 116 is a conventional computer system, such as a desktop or laptop computer. Alternatively, a client device 116 may be a device having computer functionality, such as a personal digital assistant (PDA), a mobile telephone, a smartphone or another suitable device. A client device 116 is configured to communicate via the network 120, which may comprise any combination of local area and/or wide area networks, using both wired and/or wireless communication systems.

In one embodiment, a client device 116 executes an application allowing a user of the client device 116 to interact with the various systems of the system environment 100 of FIG. 1. For example, a client device 116 can execute a browser application to enable interaction between the client device 116 and the data processing system 106 via the network 120. In another embodiment, the client device 116 interacts with the various systems of the system environment 100 through an application programming interface (API) running on a native operating system of the client device 116, such as IOS® or ANDROID™.

Figure 2:
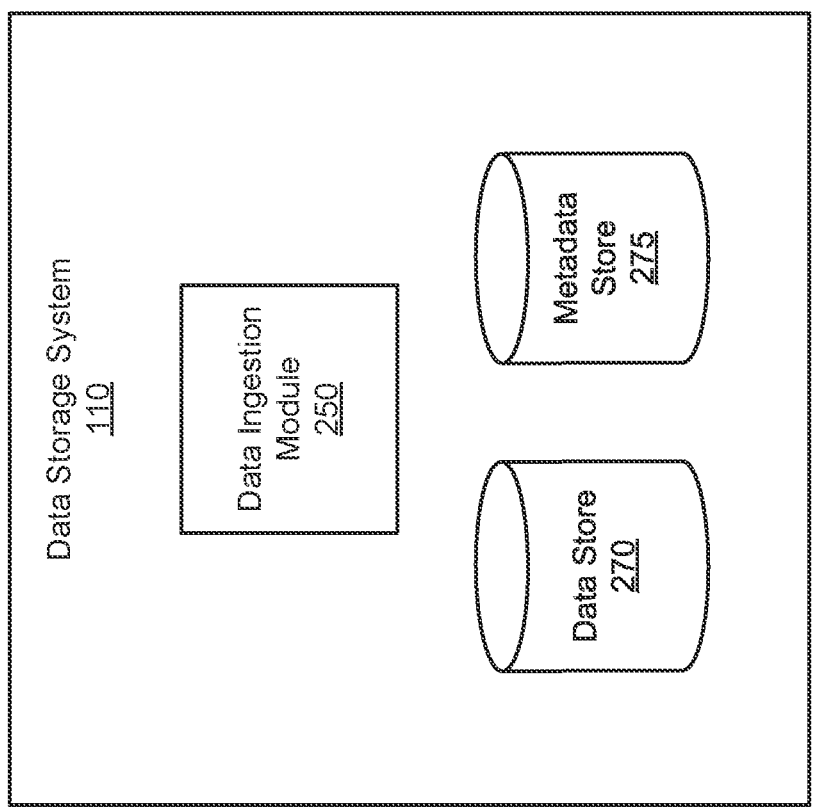
FIG. 2 illustrates a block diagram of an architecture of a data storage system, in accordance with an embodiment.

FIG. 2 is a block diagram of an architecture of a data storage system 110, in accordance with an embodiment. In one embodiment, the data storage system 110 includes a data ingestion module 250. The data ingestion module 250 ingests various forms of data into the data storage system 110. The data ingestion module 250 may ingest data from one or more external sources. For example, a tenant may store data across various data sources, such as different databases or product applications, and it may be advantageous to gather the data into the data storage system 110 for further data processing and analytics. In one instance, the data sources are third-party sources, and the data ingestion module 250 may ingest data from these sources using connectors. The data ingestion module 250 may ingest data in discrete batches, or may continuously ingest data as new data becomes available in these sources. The data storage system 110 also includes a data store 270 and a metadata store 275.

The data store 270 stores data associated with different tenants of the data processing service 102. In one embodiment, the data in data store 270 is stored in a format of a data table. A data table may include a plurality of records or instances, where each record may include values for one or more features. The records may span across multiple rows of the data table and the features may span across multiple columns of the data table. In other embodiments, the records may span across multiple columns and the features may span across multiple rows. For example, a data table associated with a security company may include a plurality of records each corresponding to a login instance of a respective user to a website, where each record includes values for a set of features including user login account, timestamp of attempted login, whether the login was successful, and the like. In one embodiment, the plurality of records of a data table may span across one or more data files. For example, a first subset of records for a data table may be included in a first data file and a second subset of records for the same data table may be included in another second data file.

In one embodiment, a data table may be stored in the data store 270 in conjunction with metadata stored in the metadata store 275. In one instance, the metadata includes transaction logs for data tables. Specifically, a transaction log for a respective data table is a log recording a sequence of transactions that were performed on the data table. A transaction may perform one or more changes to the data table that may include removal, modification, and additions of records and features to the data table, and the like. For example, a transaction may be initiated responsive to a request from a user of the client device 116. As another example, a transaction may be initiated according to policies of the data processing service 102. Thus, a transaction may write one or more changes to data tables stored in the data storage system 110.

In one embodiment, a new version of the data table is committed when changes of a respective transaction are successfully applied to the data table of the data storage system 110. Since a transaction may remove, modify, or add data files to the data table, a particular version of the data table in the transaction log may be defined with respect to the set of data files for the data table. For example, a first transaction may have created a first version of a data table defined by data files A and B each having information for a respective subset of records. A second transaction may have then created a second version of the data table defined by data files A, B and in addition, new data file C that include another respective subset of records (e.g., new records) of the data table.

In one embodiment, the transaction log may record each version of the table, the data files associated with a respective version of the data table, information pertaining to the type of transactions that were performed on the data table, the order in which the transactions were performed (e.g., transaction sequence number, a timestamp of the transaction), and an indication of data files that were subject to the transaction, and the like. In some embodiments, the transaction log may include change data for a transaction that also records the changes for data written into a data table with respect to the previous version of the data table. The change data may be at a relatively high level of granularity and may indicate the specific changes to individual records with an indication of whether the record was inserted, deleted, or updated due to the corresponding transaction.

Figure 3:
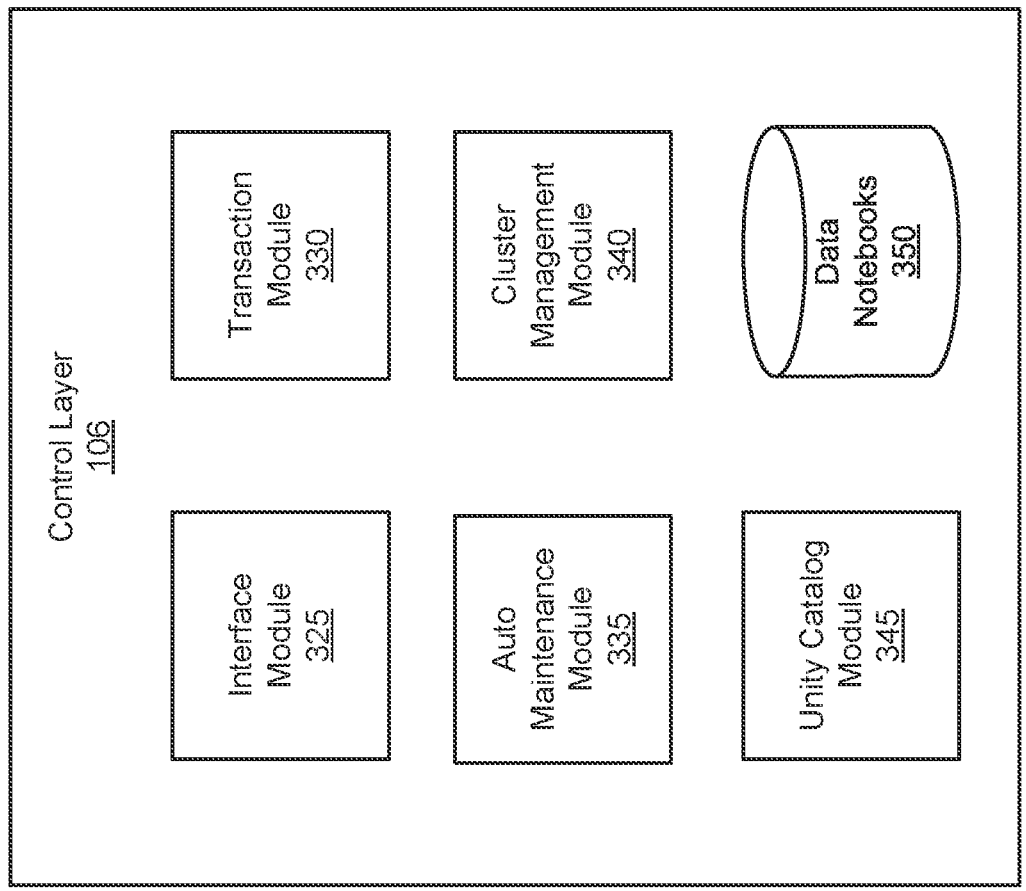
FIG. 3 illustrates a block diagram of an architecture of a control layer, in accordance with an embodiment.

FIG. 3 is a block diagram of an architecture of a control layer 106, in accordance with an embodiment. In one embodiment, the data processing system 106 includes an interface module 325, a transaction module 330, an auto maintenance module 335, a cluster management module 340, and a unity catalog module 345. The control layer 106 also includes a data notebook store 350. It is noted that as described herein a module may be structured as program code (or code snippet) composed of instructions that when executed causes a processor to be configured to execute an operation or operations as described. The program code may be executed by a computing system, for example, a set forth in FIG. 8 and may use some or all of the components described in FIG. 8.

The interface module 325 provides an interface and/or a workspace environment where users of client devices 116 (e.g., users associated with tenants) can access resources of the data processing service 102. For example, the user may retrieve information from data tables associated with a tenant, submit data processing requests such as query requests on the data tables, through the interface provided by the interface module 325. The interface provided by the interface module 325 may include notebooks, libraries, experiments, queries submitted by the user. In one embodiment, a user may access the workspace via a user interface (UI), a command line interface (CLI), or through an application programming interface (API) provided by the workspace module 325.

For example, a notebook associated with a workspace environment is a web-based interface to a document that includes runnable code, visualizations, and explanatory text. Notebooks may be stored in the data notebook store 350. A user may submit data processing requests on data tables in the form of one or more notebook jobs. The user provides code for executing the one or more jobs and indications such as the desired time for execution, number of cluster worker nodes for the jobs, cluster configurations, a notebook version, input parameters, authentication information, output storage locations, or any other type of indications for executing the jobs. The user may also view or obtain results of executing the jobs via the workspace.

The transaction module 330 receives requests to perform one or more transaction operations from users of client devices 116. As described in conjunction in FIG. 2, a request to perform a transaction operation may represent one or more requested changes to a data table. For example, the transaction may be to insert new records into an existing data table, replace existing records in the data table, or delete records in the data table. As another example, the transaction may be to rearrange or reorganize the records or the data files of a data table to, for example, improve the speed of operations, such as queries, on the data table. For example, when a particular version of a data table has a significant number of data files composing the data table, some operations may be relatively inefficient. Thus, a transaction operation may be a compaction operation that combines the records included in one or more data files into a single data file.

The auto maintenance module 335 monitors customer data tables to manage automated maintenance operations. The auto maintenance module 335 may, for example, trigger background optimization jobs based on a cost-benefit analysis. The auto maintenance module 335 receives metrics for a data table and conducts the cost-benefit analysis for candidate maintenance operations. Based on the cost-benefit analysis, the auto maintenance module 335 selects a maintenance operation to automate. The automated maintenance operation is run on an automatic schedule, without a need for user input.

The control layer 106 further includes a cluster management module 340 that monitors clusters and determines when a cluster should be initiated or terminated. The cluster management module 340 monitors the workload for existing clusters. In response to one or more queries, the cluster management module 340 can instruct the control layer 106 to initiate a cluster. The cluster management module 340 may, for example, delete a cluster, clone a cluster, edit an existing cluster, and provide a view of cluster configurations to users of the data processing service.

The control layer 106 additionally includes a unity catalog module 345. The unity catalog module 345 may, for example, grant and revoke privileges based on administrative and user permissions. The unity catalog module 345 works with the auto maintenance module 335 to determine whether a candidate operation may be automated. In some embodiments, before an operation is run on a data table, the unity catalog module 345 determines that the privileges to run the operation are available. The unity catalog may determine acceptable maintenance periods for running operations on the data table based on the user permissions or an accessibility status of the table.

Figure 4:
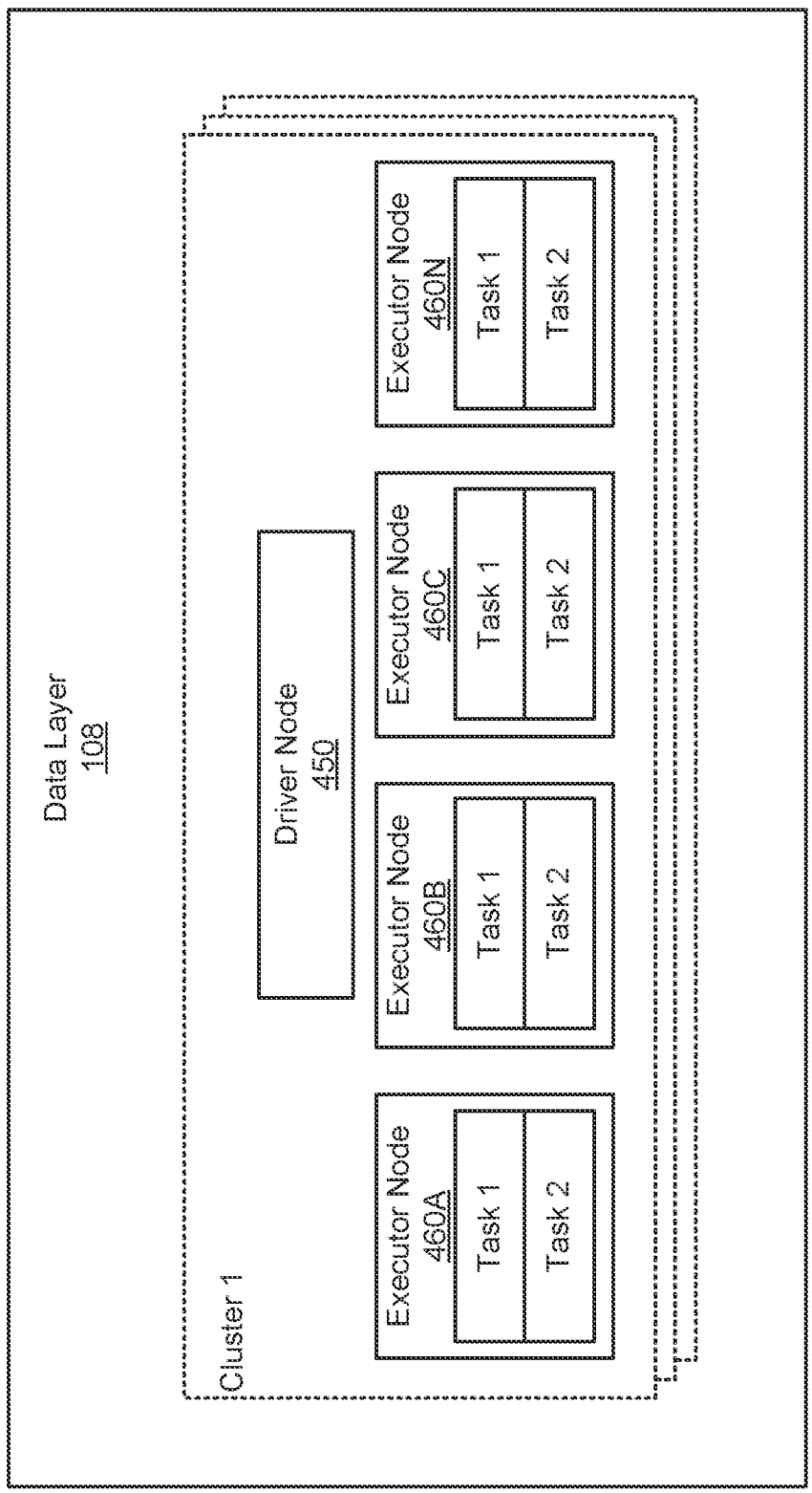
FIG. 4 illustrates a block diagram of an architecture of a cluster computing system of the data layer, in accordance with an embodiment.

FIG. 4 is a block diagram of an architecture of a cluster computing system of the data layer 108, in accordance with an embodiment. In some embodiments, the cluster computing system of the data layer 108 includes driver node 450 and a worker pool including one or more (multiple) executor nodes 460A-N (generally 460).

The driver node 450 receives one or more jobs for execution, divides a job into job stages, and provides job stages to executor nodes, receives job stage results from the executor nodes of the worker pool, and assembles job stage results into complete job results, and the like. In one embodiment, the driver node receives a request to execute one or more queries from the control layer 106. The driver node 450 may compile a database query and generate an execution plan. The driver node 450 distributes the query information including the generated code to the executor nodes. The executor nodes execute the query based on the received information.

The worker pool can include any appropriate number of executor nodes (e.g., 4 executor nodes, 12 executor nodes, 256 executor nodes). Each executor node in the worker pool includes one or more execution engines (not shown) for executing one or more tasks of a job stage. In one embodiment, an execution engine performs single-threaded task execution in which a task is processed using a single thread of the CPU. The executor node distributes one or more tasks for a job stage to the one or more execution engines and provides the results of the execution to the driver node 450. According to an embodiment, an executor node executes the generated code for the database query for a particular subset of data that is processed by the database query. The executor nodes execute the query based on the received information from the driver node 450.

Auto Maintenance

The auto maintenance module 335 allows the data processing service 102 to automate maintenance operations for data tables. Failing to run maintenance operations for extended periods of time can lead to inefficient query performance and unnecessarily bulky data tables. By automating maintenance operations, customers of the data processing service 102 are relieved of the complicated task of managing the optimization of data tables. Maintenance operations may include, for example, operations optimize, vacuum, Z-order, and analyze. Customers of the data processing service 102 can use auto maintenance to simplify their data management within the service. Additionally, certain maintenance operations can lead to cost saving by increasing query speeds and decreasing storage demand. The auto maintenance module 335 addresses the problem of customers not knowing which maintenance operations to run, how often to run operations, how to orchestrate workflows to run operations, and how to determine if running a candidate maintenance operation will have a greater benefit than cost.

Figure 5:
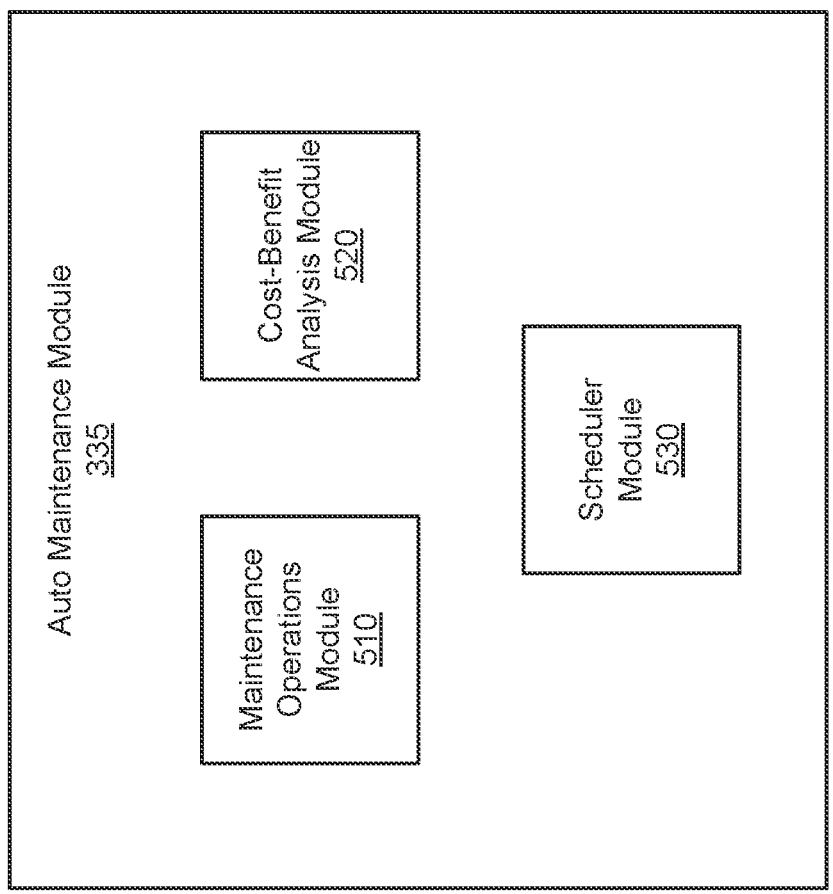
FIG. 5 is a block diagram of an architecture of a driver node, in accordance with an embodiment.

FIG. 5 illustrates one example system architecture for the auto maintenance module 335. The auto maintenance module 335 includes a maintenance operations module 510, cost-benefit analysis module 520, and scheduler module 530. In alternative embodiments, the system architecture for the auto maintenance module 335 may include additional or fewer modules.

The maintenance operations module 510 logs available operations for automation. Available operations include, for example, optimize, Z-order, analyze, vacuum, update column statistics, metadata refresh, and purge. The optimize operation compacts all small files in a data table into fewer, optimally-sized files, called bin-packing. Optimize performs bin-packing by colocating data by columns in a data table. By bin-packing, the optimize operation aims to produce evenly balanced data files. The balancing is done in respect to the file sizes on a disk. The Z-order operation colocates related information in a data table. If a table has a primary key and a low amount of statistics, the primary key columns can be used as predicates for ordering the data table. By colocating information in data tables, the Z-order operation allows for data skipping in queries, which can lead to improved query speed.

The maintenance operation analyze collects statistics about a data table that can be used by a query optimizer to determine a most efficient pathway for running a query. The analyze operation identifies a number or percentage of files added or removed since the analyze operation was last run. The analyze operation may be configured to determine whether a data table needs to be updated. The result of the analyze operation is metastatistics describing a data table, such as how many values and rows are in the table.

The vacuum operation removes data files that are no longer in the latest state of a transaction log for the table. The vacuum operation may remove files from the data table that are no longer used. The vacuum operation identifies and removes a set of files in a data table that have not been active for greater than a threshold retention time. A file is active if it has been used in a query or transaction.

The update operation updates the column value for rows that match a predicate or all rows in a data table. The metadata refresh operation invalidates and refreshes all cached data and associated data. Some data tables may contain stale metadata that must be periodically refreshed. The metadata refresh operation results in updated metastatistics for the data table. For users of the data processing service 102 that maintain external tables, the metadata refresh operation may keep the data processing service 102 updated on the data table's state. The operation purge discards of deletion vectors for a data table.

Additional operations such as checkpointing, reorg, external table refresh, and update statistics column, may be stored in the maintenance operations module 510 as candidate operations for automation. The reorg maintenance operation can rewrite files with data that has been inactive for greater than a threshold amount of time. The operation external table refresh may monitor an external data table and periodically refresh metadata describing the data table. Update statistics column is an operation that tracks the minimum and maximum statistics for a first portion of the data table. For example, update statistics column may track minimum and maximum statistics for the first 20, 32, or 50 rows of columns in the data table.

The cost-benefit analysis module 520 enables the selection of an operator for automation based on a cost-benefit assessment. For each auto maintenance candidate operation, a cost is calculated. The cost represents an expense of running a query on the data table after applying a candidate operation to the data table. For example, the cost may be lower for the optimize operation if the data table previously contained many small files. The cost may be comparably higher for the same example data table when assessing the metadata refresh as a candidate maintenance operation because the metadata operation must account for more small files. The cost may be calculated to apply the same unit across all candidate operations in order to determine which candidate operation has the lowest cost. The cost may be calculated in any units that reflect a cost, e.g., monetary, time, computer resources and/or a combination of them, for a query to be run on the data processing service 102 if a particular maintenance was executed (or run) or not executed. For example, the cost may be calculated using Databricks Units (DBU) or United States Dollars (USD), or $USD/DBU to reflect a monetary cost to a customer of the data processing service 102. A benefit may be estimated based on predicted run times for queries on the data table after applying a maintenance operation.

The cost-benefit analysis module 520 may determine a cost-benefit metric for each candidate operation and for each data table. The cost of each maintenance operation may be predicted using a machine learning cost model. The machine learning cost model is trained on a training dataset including data table metastatistics and known costs for maintenance operations ran on the data table. The benefit of each maintenance operation may be predicted using a machine learning benefit model. The machine learning benefit model may be trained on a training dataset including data table metastatistics before applying a maintenance operation and metastatistics for the data table after applying a maintenance operation. The runtime of a query on the data table before and after applying a maintenance operation may additionally be included in the training dataset. Based on the candidate maintenance operation with the best, or highest, cost-benefit metric, an operation is selected for automation on the data table.

The scheduler module 530 sets a frequency for running the auto maintenance operations. Selected operations based on the cost-benefit module 520 are put into the scheduler module 350. The scheduler module 530 can schedule multiple operations for a customer's data tables. The scheduler module 530 may additionally set a frequency for running auto maintenance analysis in order to change the set of automated operations. For example, after a maintenance operation has been automated for a period of time (e.g., a day, a month, three months), the scheduler module may trigger the auto maintenance module 335 to do an updated cost-benefit analysis and assign a new maintenance operation for automation.

Figure 6:
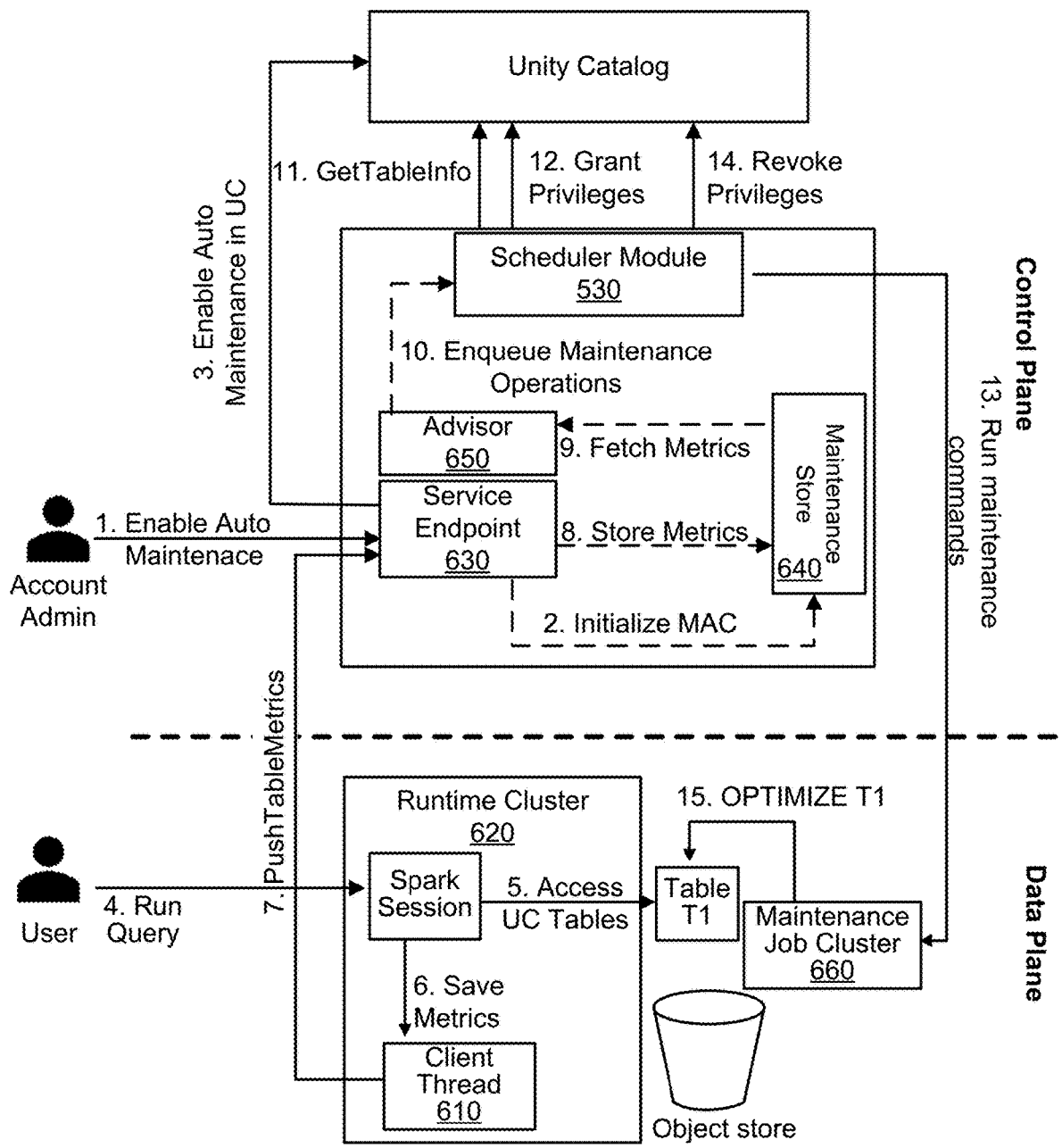
FIG. 6 is a block diagram of an example architecture of the auto maintenance system, in accordance with an embodiment.

FIG. 6 depicts a high-level overview of an example implementation of the auto maintenance module 335. An auto maintenance client thread 610 collects user query metrics and table statistics on the runtime cluster 620. The cluster may be initiated by the cluster management module 340 in response to a user query. The auto maintenance client thread 610 aggregates metrics from the runtime cluster and pushes them periodically to the auto maintenance service endpoint 630. In this example embodiment, the auto maintenance client thread 610 pushes (e.g., sends or transmits) aggregate metrics to the unity catalog 345 and the auto maintenance service endpoint 630. The auto maintenance service endpoint 630 accepts aggregated table metrics from the auto maintenance client thread and pushes the data to the maintenance store 640. The maintenance store 640 is configured to store various states for the auto maintenance module 335. States include table and query metrics that can be used to determine which maintenance operations are selected for automation from the maintenance operation module 510. For example, the table and query metrics are used by the cost-benefit analysis module 520 to determine which candidate maintenance operations should be automated. States additionally include maintenance operations produced by the advisor 650 and maintenance tasks that are scheduled and run by the scheduler 660.

The advisor 650 fetches table and query metrics from the maintenance store 640 and generates a set of candidate maintenance operations from the maintenance operations module 510 that can be run on the customer's data. The advisor 650 may generate a set of candidate maintenance operations for each table in the customer's data. The candidate maintenance operations are passed to the scheduler module 530. For example, the advisor 650 may produce compaction operations for a table with many small files, or Z-order operations for tables with queries that are highly selective and have low data skipping effectiveness. The advisor 650 may skip tables that are not actively used by the customer. In order to generate candidate maintenance operations, the advisor 650 performs a cost-benefit analysis of a plurality of maintenance operations. The cost-benefit analysis is performed using the cost-benefit analysis module 520. Each candidate maintenance operation may be labeled with a cost-benefit metric.

The scheduler module 530 launches jobs to execute maintenance operations. The scheduler module 530 communicates with the cluster management module 340 to initiate a maintenance job cluster 660. The scheduler module 530 may batch multiple maintenance operations on tables in a maintenance cluster. Each maintenance cluster may have a driver node 450 and one or more executor nodes 460A-N (generally 460). If the scheduler module 530 receives many maintenance operations for a workspace, the scheduler module 530 prioritizes the operations based on their cost-benefit metric. In some embodiments, the scheduler module 530 executes operations with the highest cost-benefit first. The scheduler module 530 may minimize customers' cost by creating effective serverless configurations for executing selected maintenance operations. In some embodiments, the jobs launched by the scheduler module 530 are serverless jobs run outside of a cloud service provider.

Figure 7:
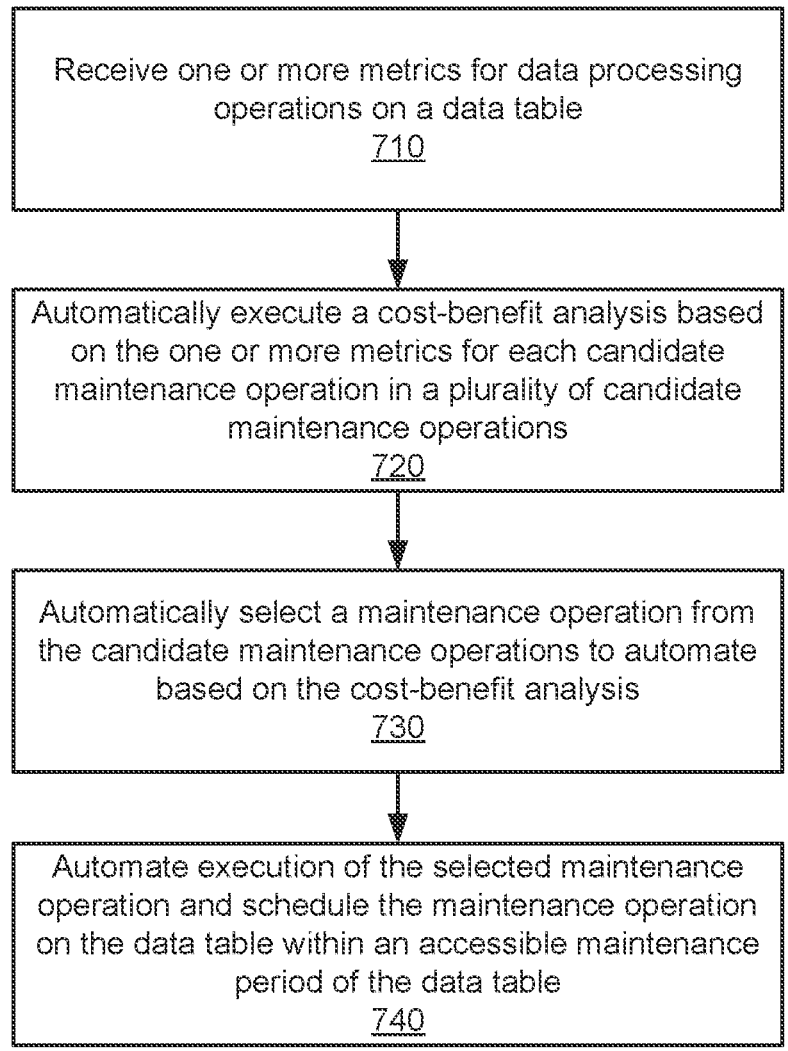
FIG. 7 illustrates a method for performing auto maintenance, in accordance with an embodiment.

FIG. 7 is a flowchart illustrating one example method for implementing the auto maintenance module 335. The data processing service 102 receives 710 one or metrics for data processing operations on a table. The metrics may describe a size of the data table, a number of files in the data table, a number of rows in the data table, a size of each file in the table, and metadata describing the data table. The data processing service 102 executes automatically 720 a cost-benefit analysis based on the one or more metrics for each candidate maintenance operation. The candidate maintenance operations are selected from the maintenance operations module 510. The cost-benefit analysis module 520 produces a predicted cost for each candidate maintenance operation and a predicted benefit. Based on the cost-benefit analysis, the data processing service 102 selects automatically 730 a maintenance operation from the candidate maintenance operations to automate. The data processing service 102 automates 740 execution of the selected maintenance operation and schedules the maintenance operation on the data table within an accessible period of the data table. The data processing service 102 uses the scheduler module 530 to determine when to run the maintenance operations, e.g., based on temporal and/or resource considerations.

In some embodiments, before automating the selected maintenance operation, the data processing service 103 uses the unity catalog module 345 to determine whether there are permissions to do so. The unity catalog module 345 may allow the automation of a selected maintenance operation only if the data processing service 102 has permissions to run the operation on the customer's table.

Example Computing System Architecture

Figure 8:
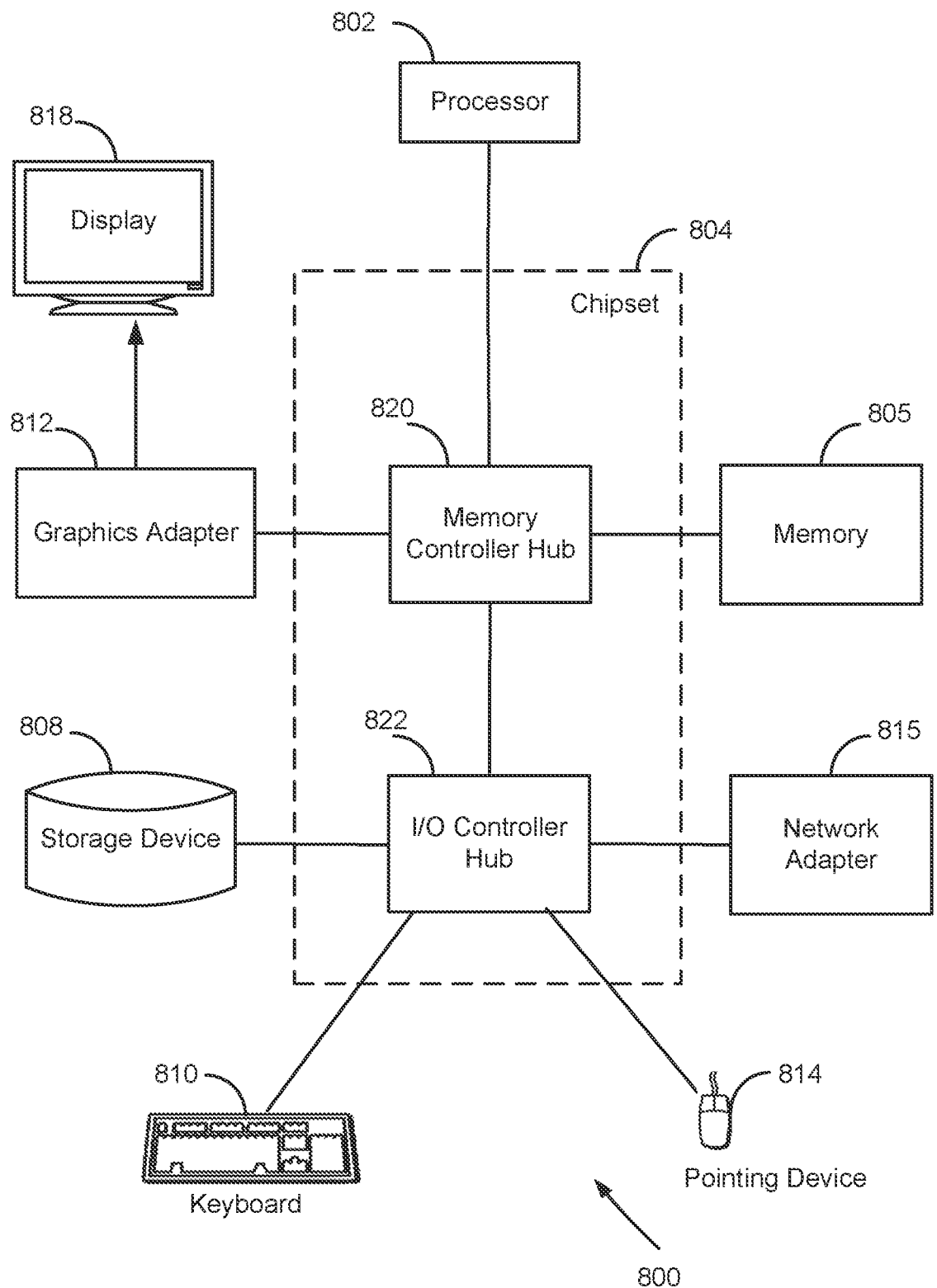
FIG. 8 is a diagram of an example computing device architecture in accordance with one embodiment.

FIG. 8 is a block diagram of an example computer 800 suitable for use in running a query on a columnar dataset, in accordance with an embodiment. The example computer 800 includes at least one processor (generally, a processor) 802 coupled to a chipset 804. The chipset 804 includes a memory controller hub 820 and an input/output (I/O) controller hub 822. At least one memory (generally, a memory) 805 and a graphics adapter 812 are coupled to the memory controller hub 820, and a display 818 is coupled to the graphics adapter 812. A storage device 808, keyboard 810, pointing device 814, and network adapter 815 are coupled to the I/O controller hub 822. Other embodiments of the computer 800 have different architectures.

In the embodiment shown in FIG. 8, the storage device 808 is a non-transitory computer-readable storage medium such as a hard drive, compact disk read-only memory (CD-ROM), DVD, or a solid-state memory device. The non-transitory computer readable storage medium and/or the memory 805 store program code and data that by be executed by the processor 802. The processor 802 may be one or more processors that may also be spread and operated across multiple physical devices. The program code may comprise instructions executable by the processor 802. The program code also may be referred to as software or a code snippet. The functionality of the modules and data processing described within this disclosure, e.g., with FIGS. 1 through 7, may be embodied as program code that provide the functionality described when executed by the processor 802.

The pointing device 814 is a mouse, track ball, touchscreen, or other type of pointing device, and may be used in combination with the keyboard 810 (which may be an on-screen keyboard) to input data into the computer system 800. The graphics adapter 812 displays images and other information on the display 818. The network adapter 815 couples the computer system 800 to one or more computer networks, such as network 120.

The types of computers used by the processing entities of FIG. 1 can vary depending upon the embodiment and the processing power required by the entity. For example, data processing service 102 might include multiple blade servers working together to provide the functionality described. Furthermore, the computers can lack some of the components described above, such as keyboards 810, graphics adapters 812, and displays 818.

Additional Considerations

The disclosed configurations beneficially provide for automating maintenance operations on data tables. Automating maintenance operations allows customers of data processing services to increase the efficiency of their workloads without having to know when to run maintenance operations or which maintenance operations to use. Customers benefit from maintenance operations that lower the expenses of their typical queries, possibly lowering the cost of their workload. Additionally, data service providers may benefit when customers have more organized, efficiently stored data. Instead of requiring a user to manually select maintenance operations for each customer data table, automating maintenance operations allows for an easy, efficient data management solution.

The foregoing description of the embodiments of the disclosure have been presented for the purpose of illustration; it is not intended to be exhaustive or to limit the disclosure to the precise forms disclosed. Persons skilled in the relevant art can appreciate that many modifications and variations are possible in light of the above disclosure.

Some portions of this description describe the embodiments of the disclosure in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the disclosure may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the disclosure may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the disclosure be limited not by this detailed description, but rather by any claims that issue on an application based hereon. Accordingly, the disclosure of the embodiments of the disclosure is intended to be illustrative, but not limiting, of the scope of the disclosure, which is set forth in the following claims.

What is claimed is:

1. A method for automating maintenance operations for a data table, the method comprising:
   receiving one or more metrics for data processing operations on the data table, the metrics describing at least one of a size of the data table, a number of files in the data table, a number of rows in the data table, a size of each file in the data table, and metadata describing the data table;
   executing automatically, for each of a plurality of candidate maintenance operations, a cost-benefit analysis based on the one or more metrics, the cost-benefit analysis determining a cost-benefit metric for each candidate maintenance operation based on a cost and a benefit of running the candidate maintenance operation on the data table;
   selecting automatically one of the plurality of candidate maintenance operations to automate based on the cost-benefit metric of each of the plurality of candidate maintenance operations; and
   automating execution of the selected maintenance operation and scheduling the selected maintenance operation on the data table within an accessible maintenance period of the data table.

2. The method of claim 1, further comprising:
   determining an accessibility for performing the selected maintenance operation periodically.

3. The method of claim 1, wherein the selected maintenance operation comprises:
   identifying a set of files in the data table that are below a threshold size; and
   compacting the set of files by combining contents of a subset of the set of files.

4. The method of claim 1, wherein the selected maintenance operation comprises:
   determining that the data table is below a threshold size;
   identifying a set of files in the data table comprising primary keys; and
   ordering the set of files based on the primary keys.

5. The method of claim 1, wherein the selected maintenance operation comprises:

collecting information describing a number of added files and a number of removed files from the data table since a last time the selected maintenance operation was run.

6. The method of claim 1, wherein the selected maintenance operation comprises:
identifying a set of files from the data table that have not been active for greater than a threshold period of time; and
removing the set of files.

7. The method of claim 1, wherein the data table is an external data table and the selected maintenance operation comprises:
monitoring the data table; and
refreshingly periodically metadata describing the data table.

8. The method of claim 1, wherein the selected maintenance operation is serverless.

9. The method of claim 1, wherein the cost-benefit analysis is executed automatically responsive to a triggering event, the method further comprising:
selecting automatically a new maintenance operation from the plurality of candidate maintenance operations to automate based on the cost-benefit analysis responsive to the triggering event; and
automating execution of the selected new maintenance operation and scheduling the selected new maintenance operation on the data table within the accessible maintenance period of the data table.

10. A non-transitory computer-readable medium comprising stored instructions that when executed by one or more processors of one or more computing devices, cause the one or more computing devices to:
receive one or more metrics for data processing operations on a data table, the metrics describing at least one of a size of the data table, a number of files in the data table, a number of rows in the data table, a size of each file in the data table, and metadata describing the data table;
execute automatically, for each of a plurality of candidate maintenance operations, a cost-benefit analysis based on the one or more metrics, the cost-benefit analysis determining a cost-benefit metric for each candidate maintenance operation based on a cost and a benefit of running the candidate maintenance operation on the data table;
select automatically one of the plurality of candidate maintenance operations to automate based on the cost-benefit metric of each of the plurality of candidate maintenance operations; and
automate execution of the selected maintenance operation and scheduling the selected maintenance operation on the data table within an accessible maintenance period of the data table.

11. The non-transitory computer-readable medium of claim 10, wherein the stored instructions further comprise stored instructions that when executed by the one or more processors cause the one or more computing devices to:
determine an accessibility for performing the selected maintenance operation periodically.

12. The non-transitory computer-readable medium of claim 10, wherein the instructions to select automatically the maintenance operation further comprises instructions that when executed by the one or more processors causes the one or more computing devices to:
identify a set of files in the data table that are below a threshold size; and
compact the set of files by combining contents of a subset of the set of files.

13. The non-transitory computer-readable medium of claim 10, wherein the instructions to select automatically the maintenance operation further comprises instructions that when executed by the one or more processors causes the one or more computing devices to:
determine that the data table is below a threshold size;
identify a set of files in the data table comprising primary keys; and
ordering the set of files based on the primary keys.

14. The non-transitory computer-readable medium of claim 10, wherein the instructions to select automatically the maintenance operation further comprises instructions that when executed by the one or more processors causes the one or more computing devices to:
collect information describing a number of added files and a number of removed files from the data table since a last time the selected maintenance operation was run.

15. The non-transitory computer-readable medium of claim 10, instructions to select automatically the maintenance operation further comprises instructions that when executed by the one or more processors causes the one or more computing devices to:
identify a set of files from the data table that have not been active for greater than a threshold period of time; and
remove the set of files.

16. The non-transitory computer-readable medium of claim 10, wherein the data table is an external data table and the instructions to select automatically the maintenance operation further comprises instructions that when executed by the one or more processors causes the one or more computing devices to:
monitor the data table; and
refresh periodically metadata describing the data table.

17. The non-transitory computer-readable medium of claim 10, wherein the selected maintenance operation is serverless.

18. The non-transitory computer-readable medium of claim 10, wherein the cost-benefit analysis is executed automatically responsive to a triggering event, and further comprising stored instructions that when executed by the one or more processors causes the one or more computing devices to:
select automatically a new maintenance operation from the plurality of candidate maintenance operations to automate based on the cost-benefit analysis responsive to the triggering event; and
automate execution of the selected new maintenance operation and schedule the selected new maintenance operation on the data table within the accessible maintenance period of the data table.

19. A system comprising:
one or more computer processors; and
one or more computer-readable mediums comprising stored instructions that, when executed by the one or more computer processors, cause the system to:
receive one or more metrics for data processing operations on a data table, the metrics describing at least one of a size of the data table, a number of files in the data table, a number of rows in the data table, a size of each file in the data table, and metadata describing the data table;
execute automatically, for each of a plurality of candidate maintenance operations, a cost-benefit analysis based on the one or more metrics, the cost-benefit analysis determining a cost-benefit metric for each candidate maintenance operation based on a cost and a benefit of running the candidate maintenance operation on the data table;

select automatically one of the plurality of candidate maintenance operations to automate based on the cost-benefit metric of each of the plurality of candidate maintenance operations; and automate execution of the selected maintenance operation and schedule the selected maintenance operation on the data table within an accessible maintenance period of the data table.

20. The system of claim 19, further comprising stored instructions that when executed by the one or more processors causes the system to:

determine an accessibility for performing the selected maintenance operation periodically.

\* \* \* \* \*